Jan. 25, 1955 W. A. GOSS 2,700,263

ADJUSTABLE MOWER CUTTER BAR

Original Filed March 26, 1951 8 Sheets-Sheet 1

INVENTOR.
WILLIAM A. GOSS
BY Whittemore, Hulbert & Belknap
ATTORNEYS

Jan. 25, 1955 W. A. GOSS 2,700,263

ADJUSTABLE MOWER CUTTER BAR

Original Filed March 26, 1951 8 Sheets-Sheet 2

*INVENTOR.*
WILLIAM A. GOSS
*BY* Whittemore,
Hulbert & Belknap
ATTORNEYS

Jan. 25, 1955 W. A. GOSS 2,700,263

ADJUSTABLE MOWER CUTTER BAR

Original Filed March 26, 1951 8 Sheets-Sheet 3

*INVENTOR.*
WILLIAM A. GOSS
*BY* Whittemore, Hulbert & Belknap
ATTORNEYS

Jan. 25, 1955 W. A. GOSS 2,700,263

ADJUSTABLE MOWER CUTTER BAR

Original Filed March 26, 1951 8 Sheets-Sheet 4

INVENTOR.
WILLIAM A. GOSS
BY Whittemore,
Hulbert & Belknap
ATTORNEYS

ADJUSTABLE MOWER CUTTER BAR

Original Filed March 26, 1951 8 Sheets-Sheet 5

INVENTOR.
WILLIAM A. GOSS
BY Whittemore
Hulbert & Belknap
ATTORNEYS

Jan. 25, 1955 W. A. GOSS 2,700,263

ADJUSTABLE MOWER CUTTER BAR

Original Filed March 26, 1951 8 Sheets-Sheet 6

INVENTOR.
WILLIAM A. GOSS
BY Whittemore, Hulbert & Belknap
ATTORNEYS

ADJUSTABLE MOWER CUTTER BAR
Original Filed March 26, 1951 8 Sheets-Sheet 7
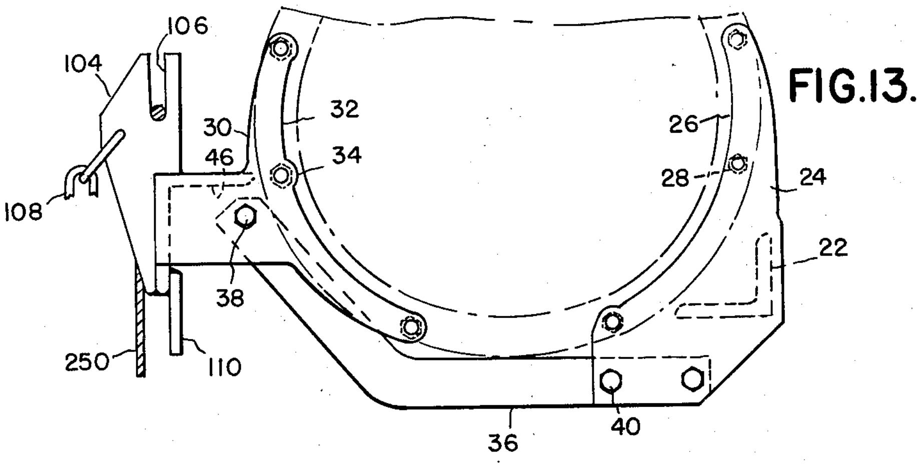
FIG.13.
FIG.14.
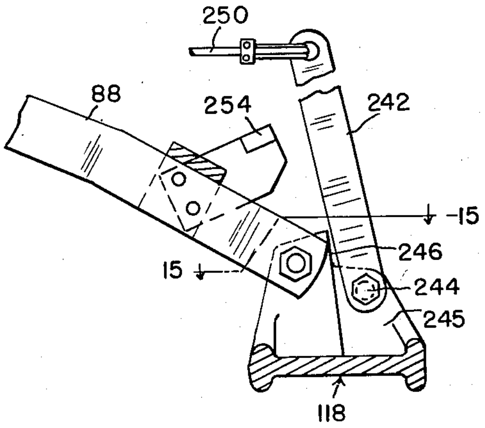
FIG.15.
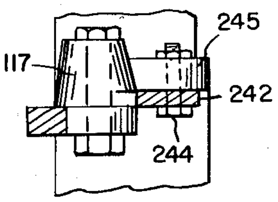
INVENTOR.
WILLIAM A. GOSS
BY Whittemore, Hulbert & Belknap
ATTORNEYS FIG.16.
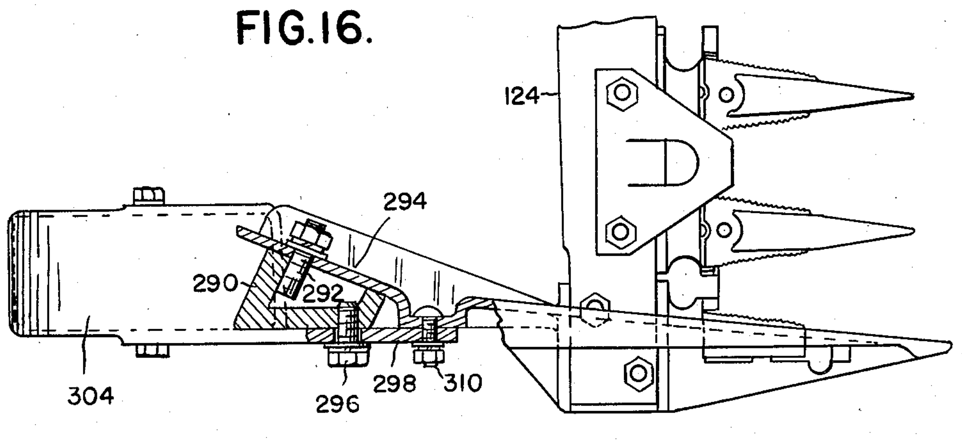
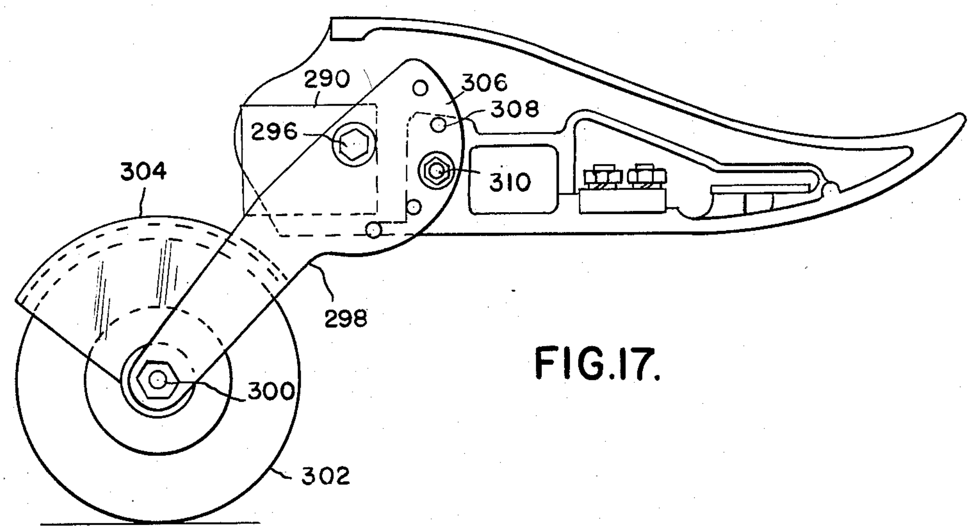
FIG.17.
INVENTOR.
WILLIAM A. GOSS
BY Whittemore, Hulbert & Belknap
ATTORNEYS
Jan. 25, 1955  W. A. GOSS  2,700,263
ADJUSTABLE MOWER CUTTER BAR
Original Filed March 26, 1951  8 Sheets-Sheet 8
INVENTOR.
BY Whittemore,
Hulbert & Belknap
ATTORNEYS United States Patent Office 2,700,263

Patented Jan. 25, 1955

1

2,700,263

ADJUSTABLE MOWER CUTTER BAR

William A. Goss, Zanesville, Ohio, assignor to Detroit Harvester Company, Detroit, Mich., a corporation of Michigan

Original application March 26, 1951, Serial No. 217,451. Divided and this application April 29, 1952, Serial No. 285,015

3 Claims. (Cl. 56—25)

The present invention relates to side mower structure, and more particularly, to mowing mechanism in association with a tractor characterized by its efficiency in operation, the flexibility of means for controlling the position of the cutter bar, and improved structure for supporting the drag bar and cutter bar in transit.

The present invention is a division of my copending application Serial No. 217,451, filed March 26, 1951.

It is an object of the present invention to provide mowing mechanism adapted to be connected to a tractor to be operated from the power take-off of the tractor including power mechanism for tilting the cutter bar a predetermined amount, and thereafter raising the cutter bar and drag bar as a unit.

It is a further object of the present invention to provide a drag bar connected to one side of the tractor for lifting movement in a vertical plane, a cutter bar pivoted to the free end of the drag bar, a combined tilting and lifting arm pivoted to the cutter bar, an abutment on the cutter bar in position to be engaged by the arm whereby movement of the arm tilts the cutter bar vertically about its connection with the drag bar, a second abutment on the drag bar in position to be engaged by the arm upon predetermined tilting movement of the cutter bar whereby further movement of the arm lifts the drag bar and cutter bar as a unit.

It is a further object of the present invention to provide power mechanism for first tilting a cutter bar vertically about an axis extending longitudinally of a tractor adjacent the inner end of the cutter bar, and for thereafter raising the inner end of the cutter bar, suspension means independent of the tilting and lifting means for retaining the inner end of the cutter bar in predetermined raised position, and adjustable ground engaging means at the free end of the cutter bar for supporting the free end of the cutter bar in predetermined position.

It is a further object of the present invention to provide in a tractor-mower, a vertically adjustable drag bar, a vertically swingable cutter bar, power means for sequentially swinging said cutter bar vertically and elevating said drag bar, suspension means independent of said power means for suspending said drag bar, and means engageable with the cutter bar for supporting the cutter bar in vertical position.

Other objects and features of the invention will become apparent as the description proceeds, especially when taken in conjunction with the accompanying drawings, wherein:

Figure 13 is a transverse sectional view substantially on the line 13—13, Figure 10, showing the relationship of the supporting structure to the tractor.

Figure 14 is a section on the line 14—14, Figure 3, showing the relationship between the lift arm, cutter bar, shoe and drag bar.

Figure 15 is an enlarged section on the line 15—15, Figure 14.

Figure 16 is a plan view with parts broken away and shown in section looking in the direction of the arrows 16—16, Figure 6.

Figure 17 is an enlarged end elevation of the outer end of the cutter bar looking in the direction of the arrows 17—17, Figure 6.

The present invention relates primarily to a tractor-mower combination and to mower mechanism adapted to be assembled with a tractor. In general, portions of the tractor are shown in broken lines, whereas the mower attachment structure is shown in full lines.

The present invention relates primarily to the mounting and support, and control of the drag bar and cutter bar of the mower mechanism, but for completeness of understanding, the essential cooperating parts of the mower mechanism are described more or less in detail.

Figure 1:
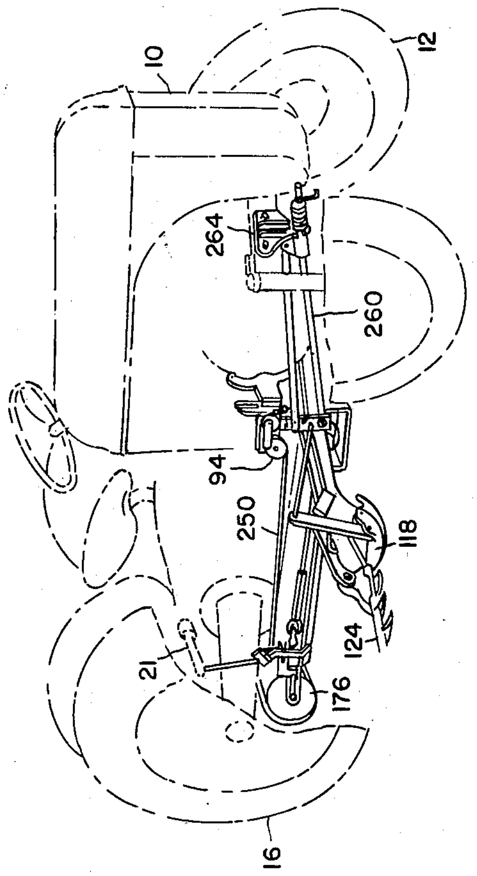
Figure 1 is a fragmentary perspective view showing a portion of the tractor in dotted lines and the mower assembly mounted on the tractor in full lines.
Figure 2:
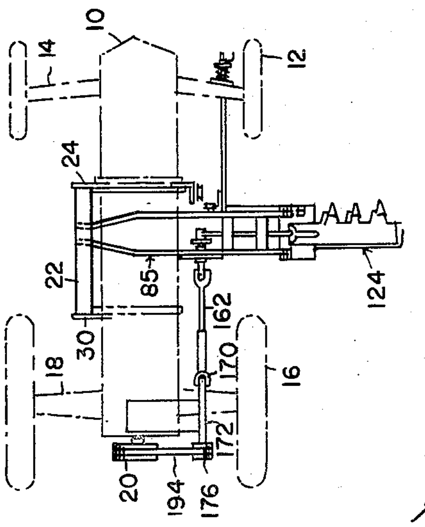
Figure 2 is a fragmentary plan view on a reduced scale of the mower mechanism, the outline of the tractor being shown in dotted lines.

As best seen in Figures 1 and 2, the tractor comprises a main frame 10, front wheels 12 connected by a front axle 14, rear wheels 16 connected by a rear axle 18, a power take-off shaft including a drive pulley 20, and a rearwardly extending vertically movable power lift lever 21.

The mowing mechanism is designed especially to comprise a main sub-assembly which may be quickly applied to and removed from the tractor, suitable supporting means for the detachable structure being secured to the tractor, and provided with quickly removable coupling means for connecting and disconnecting the detachable sub-assembly and supporting structure.

Figures 10, 11, 12:
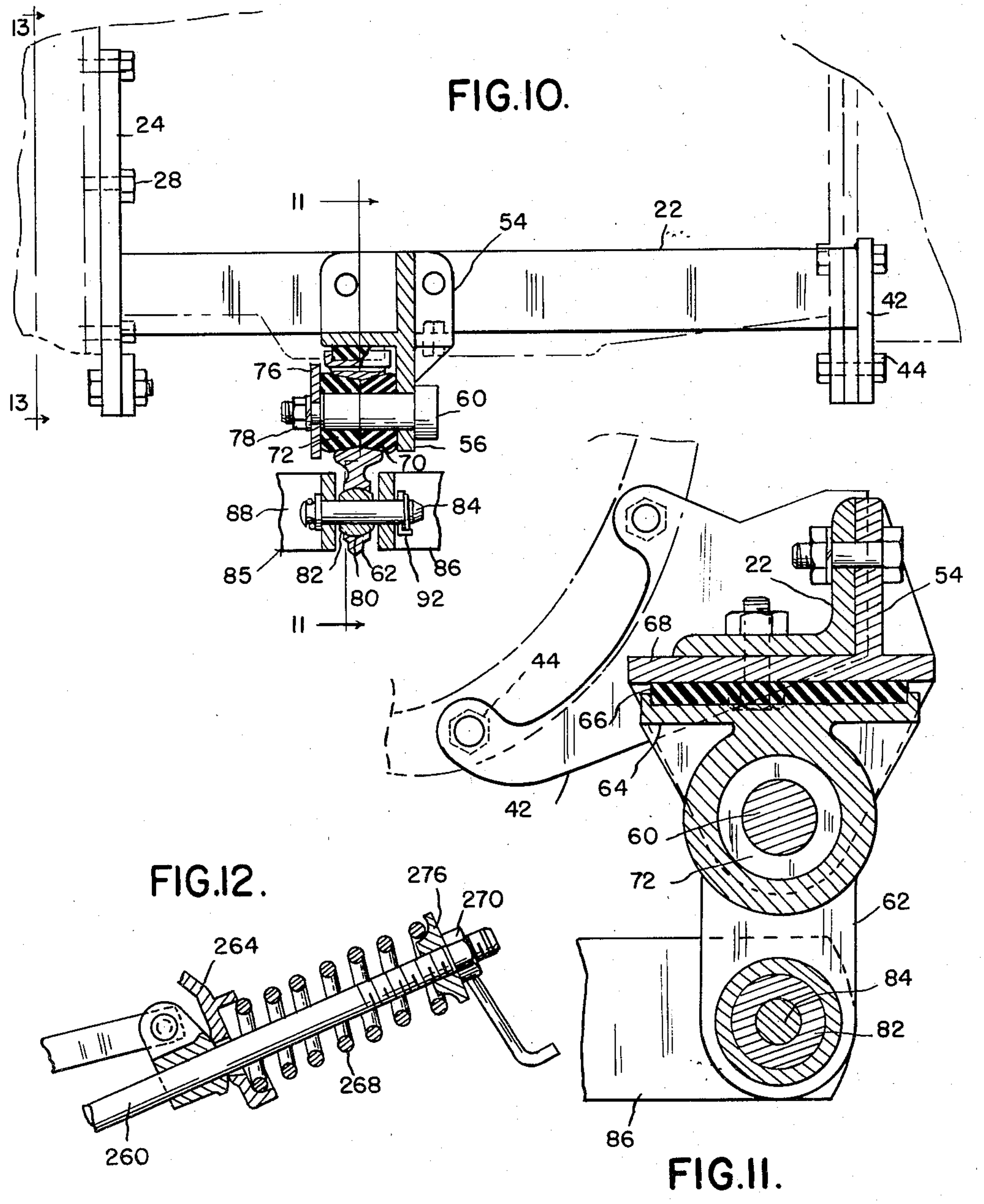
Figure 10 is a fragmentary side elevation with parts broken away and shown in section, from the left hand side of the tractor, showing the drag bar supporting structure.
Figure 11 is an enlarged fragmentary section on the line 11—11, Figure 10.
Figure 12 is an enlarged central longitudinal section through the forward end of a pull bar holding the drag bar against rearward swinging movement.

The supporting structure which is permanently mounted to the tractor includes an angle iron 22, best seen in Figures 2, 10 and 13, located at the left side of the tractor and welded or otherwise secured at its forward end to a plate 24. The plate 24 includes an inner arcuate surface 26 engageable with a portion of the frame of the tractor and is bolted thereto as indicated at 28.

As best seen in Figure 13, a second plate 30 is provided which also has an inner arcuate surface 32 engageable with a cylindrical portion of the tractor and is bolted to a flange of the tractor as indicated at 34. The bolts 28 and 34 replace the usual assembly bolts provided on the tractor.

Plates 24 and 30 are interconnected by a tie strap 36 which is bolted to the plate 30 as indicated at 38, and to the plate 24 as indicated at 40. Thus, the plates 24 and 30 together comprise an assembly surrounding an intermediate cylindrical portion of the tractor frame and are rigidly and permanently secured to a flange portion of the tractor frame.

Referring again to Figure 10, the rear end of the angle iron 22 has welded or otherwise secured thereto a plate 42 which is bolted to the body of the tractor as indicated at 44. Again, the bolts 44 replace tractor assembly bolts and the structure thus far described is intended to become a permanent part of the tractor.

At the right hand side of the tractor, as best seen in

Figure 13, there is provided an angle iron 46 which is welded or otherwise secured to the plate 30 and which has welded or otherwise secured to its opposite end a strap 48 (Figure 3), which is bolted or otherwise secured to a mounting member 52 forming a permanent part of the tractor.

The supporting structure thus far defined comprises the main support for the drag bar and cutter bar as will now be described.

Referring to Figures 10 and 11 the angle iron 22, at the left hand side of the machine, has bolted or otherwise secured thereto a support bracket 54 having a vertical depending web 56 provided with an opening therethrough receiving a pin 60. Connected by the pin 60 is a pivot bracket 62 which adjacent its upper end has a flat recessed portion 64 adapted to receive a rubber pad 66. The bracket 54 includes a flat horizontally extending flange 68 which is separated from the recessed portion 64 by the rubber pad 66.

In addition, the pivot bracket 62 includes an enlarged opening 70 through which the pin 60 extends. The opening 70 is of such size to receive two rubber bushings 72 which surround the pin 60. The outer end of the pin 60 is reduced and has associated therewith a washer 76 and retaining nut 78. The washer 76 is held up against the enlarged intermediate portion of the pin and is so spaced thereby from the vertical web 56 that substantial clearance exists at either side of the pivot bracket 62. As a result of this arrangement the pivot bracket 62 is resiliently supported from the bracket 54 with provision for limited movement relative thereto as permitted by the rubber pad 66 and the rubber bushings 72.

At its lower end the pivot bracket 62 has a spherically formed opening 80 which receives a spherical member 82. Member 82 is provided with a through opening and receives a coupling pin 84, the pin extending through suitable openings provided adjacent the end of the drag bar 85 and specifically, through the straps 86 and 88 which form the drag bar.

As a result of the structure thus far described, the drag bar 85 is mounted for vertical swinging movement about the axis of the coupling pin 84. In addition, the drag bar assembly may swing rearwardly about a vertical axis and may also be swiveled on its own longitudinal axis a limited amount. The coupling pin 84 includes a retainer pin 92 which may be removed to permit quick assembly and disassembly of the actual mower mechanism from the tractor, leaving the bracket 62 in place thereon.

Figure 3:
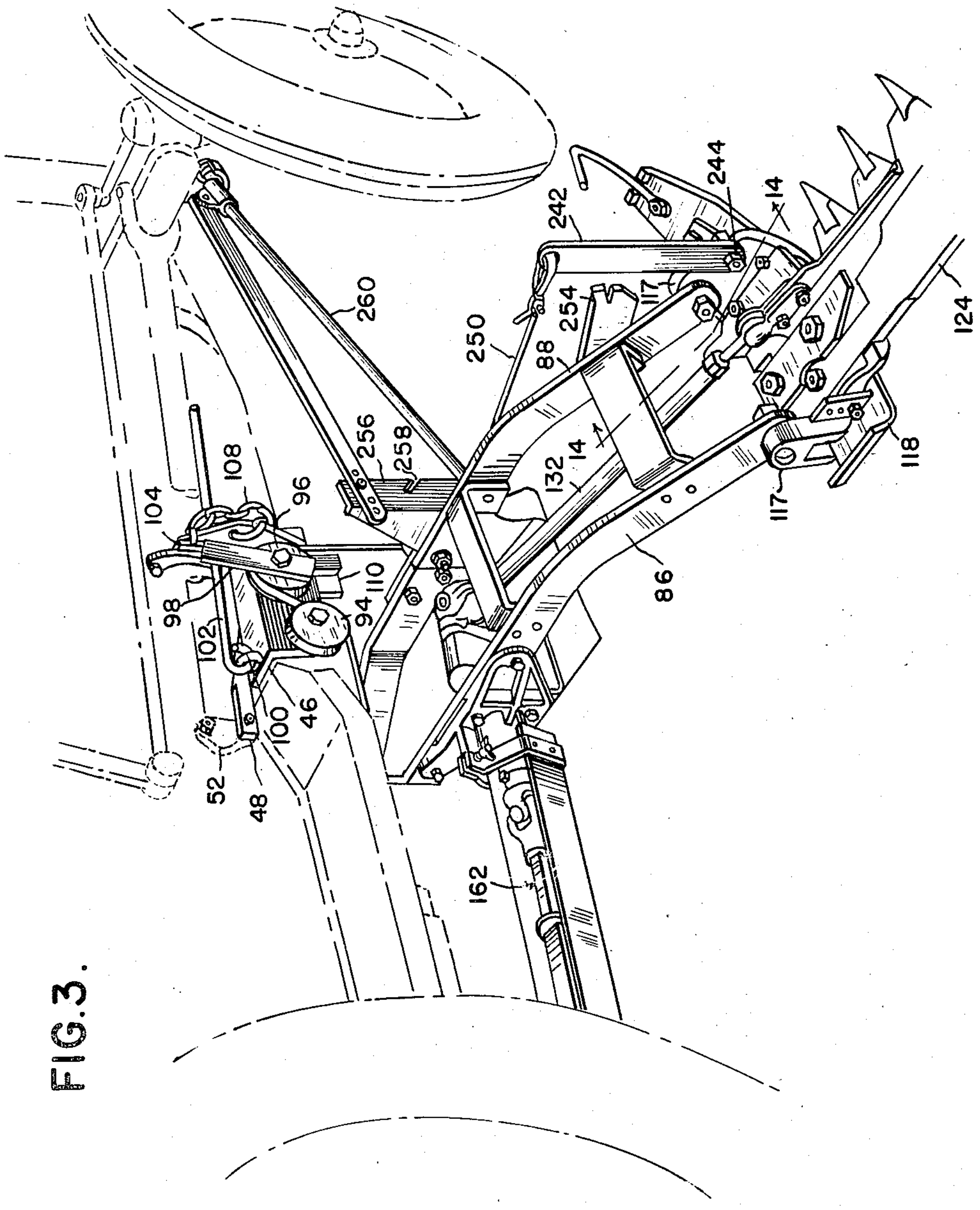
Figure 3 is an enlarged perspective view of the mower mechanism looking forwardly at the right hand side of the tractor.
Figure 4:
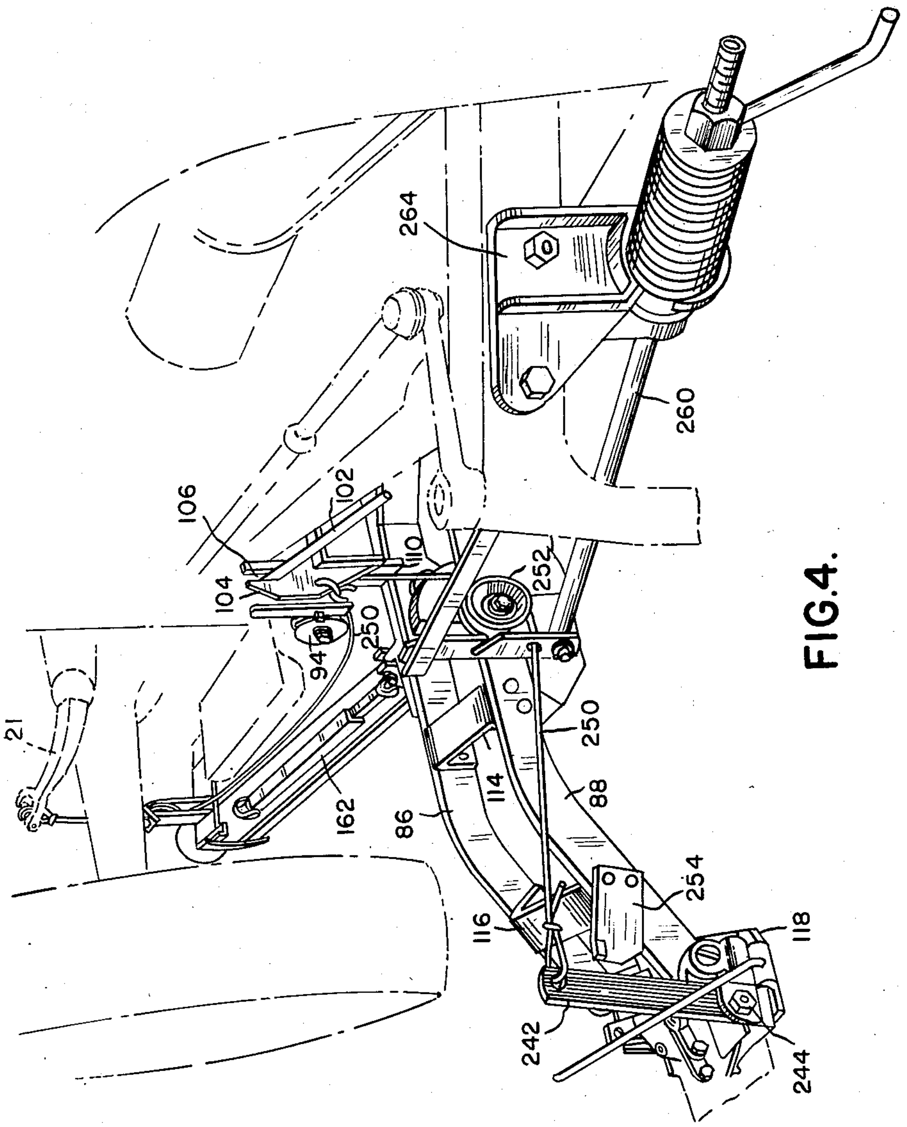
Figure 4 is a perspective view of the mower mechanism looking rearwardly at the right hand side of the tractor.

As best seen in Figures 3 and 4, at the right hand side of the machine the angle iron 46 has pivoted thereto a pair of sheaves or pulleys 94 and 96 over which a tilting and lifting cable, later to be described, is led. A retainer plate 98 is pivoted to the pivot mounting of one of the pulleys and may be swung to a position permitting the lifting cable to be threaded over the pulleys or to a second position in which it serves to prevent accidental disengagement between the pulleys and the sheaves. Thus, when the mower mechanism is to be detached from the tractor, a retainer plate 98 will be swung to a position in which the lifting cable may be fitted to the pulleys and thereafter swung to its operative or retaining position.

In addition, the angle iron 46 includes an eye 100 to which is secured a transport rod 102 adapted to retain the cutter bar in elevated position in transport. The bracket or angle iron 46 is provided with an upstanding arm 104 provided with a notch 106. When not in use the transport rod 102 is received within the notch 106, as best illustrated in Figure 4, and may be swung from this position to the transport position best illustrated in Figure 7 by reason of the universal connection afforded by the eye 100.

The arm 104 also has secured thereto a suspension chain 108 which operates to retain the free end of the drag bar in any predetermined elevated position, independent of power lift mechanism as will later appear. Also carried by the bracket 46 is a depending stop member 110 which is adapted to be engaged by a portion of the drag bar and to limit its upward swinging movement.

Figures 8, 9:
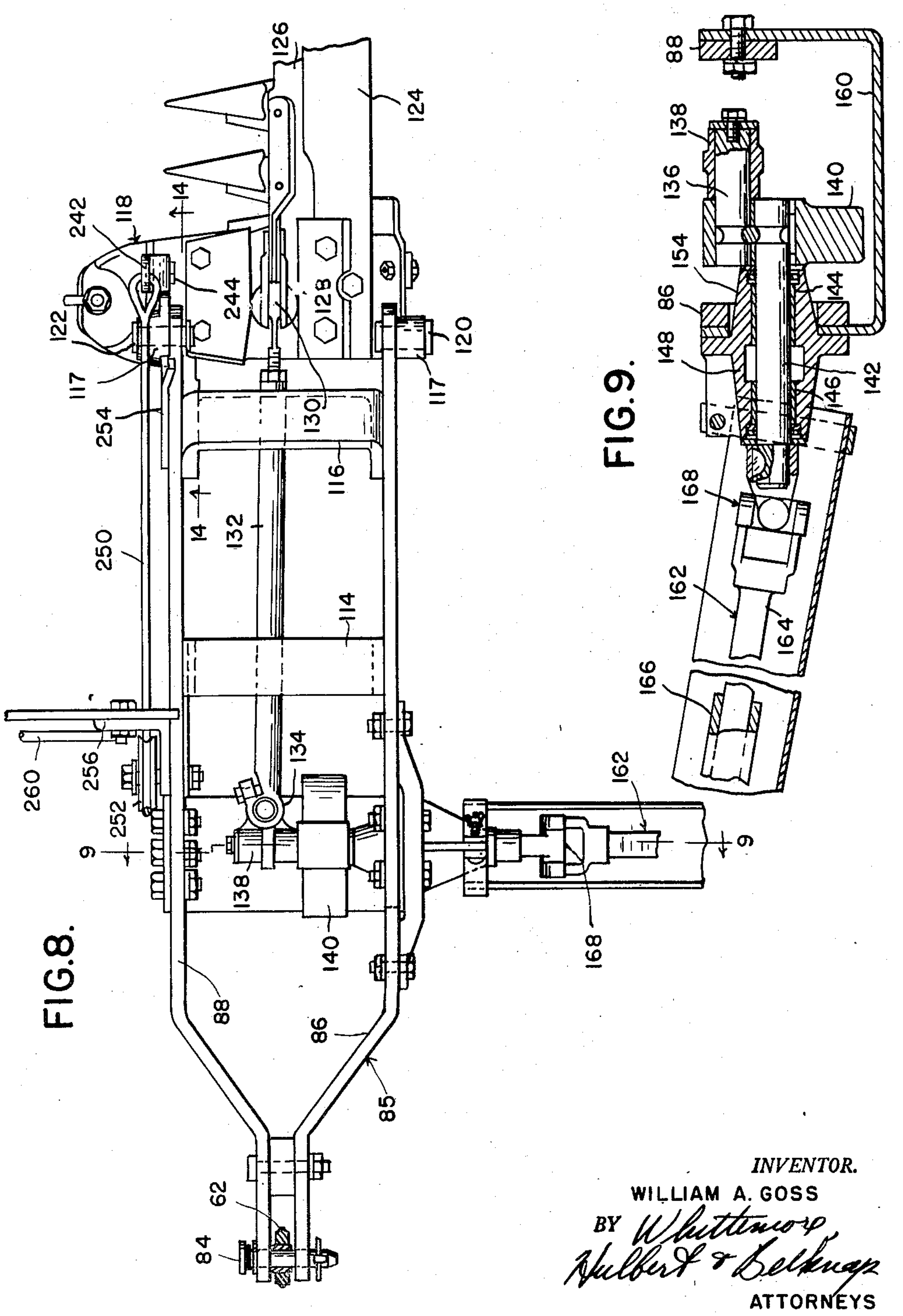
Figure 8 is an enlarged plan view of the drag bar and parts associated therewith, taken substantially on the line 8—8, Figure 5.
Figure 9 is an enlarged fragmentary section on the line 9—9, Figure 8.

The drag bar indicated generally at 85 is best illustrated in Figure 8. It is made up of two straps 86 and 88 which are interconnected by cross straps 114 and 116. At their outer ends the drag bar straps 86 and 88 are located between ears 117 of an inner shoe 118 by pivot bolts 120 and 122. The inner shoe 118 has rigidly secured thereto the usual cutter bar 124 carring a sickle 126 mounted for longitudinal reciprocation in the usual manner. The sickle 126 includes a socket construction 128 adapted to connect with the ball 130 at the outer end of a pitman rod 132. The inner end of the pitman rod 132 includes a coupling 134 which is connected to a crank pin 136 by an intermediate coupling member 138, permitting universal movement of the pitman rod 132 relative to the axis of the crank. The crank includes a fly wheel 140 connected to a crank shaft 142 supported in bearings 144 and 146 in a bearing casting 148. The casting 148 includes a reduced conical portion 154 which extends through an opening provided in the rear drag bar strap 86. Preferably, a U-shaped guard 160 is secured to the drag bar straps 86 and 88 in the zone underlying the fly wheel to afford protection for the same.

The mechanism for imparting rotation to the crank shaft and fly wheel 140 comprises a drive shaft 162 including a forwardly reduced portion 164 telescopically received in a rear drive shaft portion 166. The rear end of the crank shaft 142 is connected to the drive shaft 162 by a universal joint indicated generally at 168. At its rear end the drive shaft includes a second universal joint 170 which connects the shaft 162 to a shaft 172 carrying a driving pulley or sheave 176 coplanar with the pulley or sheave 20 of the power take-off of the tractor and connected thereto by a belt 194.

The inner shoe 118 of the cutter bar has a tilting and lifting arm 242 which is pivoted thereto by a pivot support 244, best seen in Figures 3, 4, 14 and 15. The configuration of the inner shoe adjacent the arm 242 is best illustrated in Figures 14 and 15, where as will be apparent, the forward ear 117 of the shoe 118 has an offset portion 245 to which arm 242 is pivoted, thereby providing an abutment surface 246 against which the arm engages when rocked in a counterclockwise direction as seen in Figure 14.

At the upper end of the arm 242 is a tilting and lifting cable 250 which extends from the arm 242 under a pulley 252 carried by the drag bar 85 intermediate its ends and thence upwardly over the pulley 96 and under the pulley 94. From here the cable leads rearwardly to a pulley 253 located beneath the power lifting lever 21. The drag bar strap 88 is provided with a rigid abutment 254 which is adapted to be engaged by the arm 242 after a predetermined swinging movement of the inner shoe 118 and the cutter bar 124. In practice the abutment 254 is provided so that approximately 15 degrees of upward tilting movement of the cutter bar 124 is permitted. Thereafter, the arm 242 engages the abutment 254 and further movement of the cable 250 in a lifting direction results in an upward swinging movement of the drag bar 85 and the cutter bar 124 as a unit about the axis of the coupling pin 84. Upward movement of the drag bar 85 is limited by engagement with the stop 110.

Secured to the strap 88 of the drag bar is a vertically extending angle piece 256 which includes an upwardly inclined slot 258. The suspension chain 108 previously referred to, is adapted to have a selected one of its links engaged in the slot 258 to retain the drag bar 85 in any elevated position independently of the power lifting mechanism. Thus, the chain 108 may be used to support the drag bar and the cutter bar carried thereby during transport. At the same time the chain may be engaged with the drag bar to limit downward movement of the drag bar or to support the weight thereof in some intermediate position if desired.

Means are provided for holding the drag bar forwardly against rearward pull during use and this means comprises generally a bar or rod 260 extending forwardly from the drag bar and suitably connected to a bracket 264 on the front axle of the machine. As best seen in Figure 12, the rod 260 extends forwardly through an opening in the bracket 264, the forwardly projecting portion thereof carrying a coil compression spring 268 held in place by a nut 270 threaded to the rod 260 and engaging a spring retainer 276. This arrangement permits limited rearward yielding motion of the drag bar when it encounters obstacles.

Referring now to Figures 16 and 17 there is illustrated means at the outer end of the cutter bar 124 for varying its height above the ground during operation. As seen in these figures, there is provided a block 290 having a threaded stud 292 welded or otherwise secured thereto which extends through an opening in the rearwardly extending guard plate 294 carried by the outer shoe of the cutter bar. The pivot bolt 296 passes through an opening in an adjustable wheel supporting arm 298, thus mounting the arm for adjustment about a horizontal axis. The arm 298 at its lower end has a pivot connection 300 for a ground wheel 302 and includes a guard portion 304 overlying a portion of the wheel. The arm 298 includes a partially circular portion 306 having a series of openings 308 arranged in an ac about which the pivot bolts 296 extend. A fastening bolt 310 extends through one of the openings 308 and through an opening in the guard plate 304, thus locking the arm 298 in adjusted position. As is apparent from Figure 17, angular adjustment of the arm 298 has the effect of raising and lowering the outer end of the cutter bar assuming that the wheel 302 remains in contact with the ground.

Figure 5:
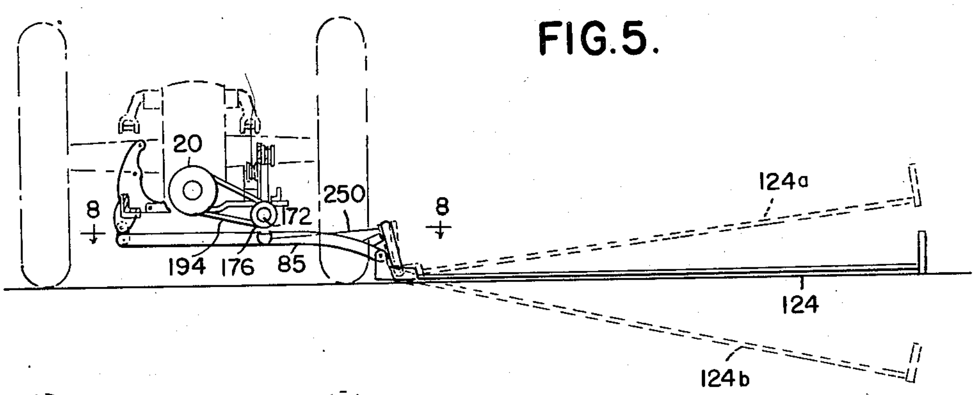
Figure 5 is a more or less diagrammatic rear elevational view of the tractor-mower illustrating adjustability of the cutter bar with parts broken away and shown in section.
Figure 6:
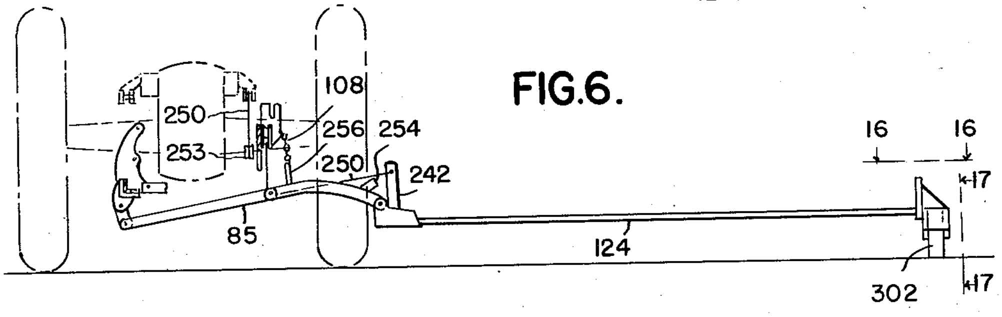
Figure 6 is a view similar to Figure 5 showing the drag bar partially elevated.
Figure 7:
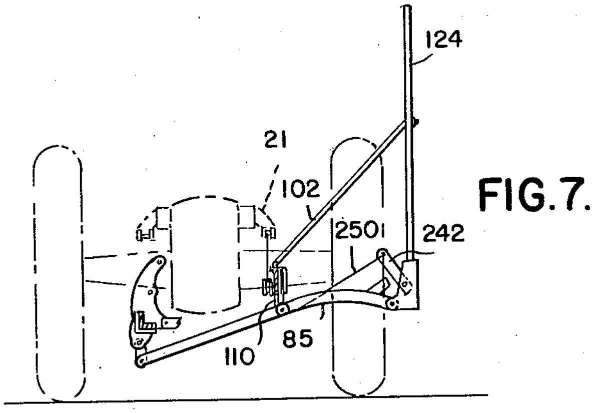
Figure 7 is a view similar to Figure 5 showing the drag bar and cutter bar in fully elevated or transport position.

With the mechanism thus far described, several adjustments, as best indicated in Figures 5, 6 and 7, are provided for. Referring now to Figure 5 the cutter bar 124 is shown in full lines in position to cut close to the ground where the ground is level. The cutter bar is indicated in an elevated position at 124*a*, this adjustment being possible by operation of the power lift lever pulled on the cable 250 and moving the combined lifting and tilting arm 242 against the stop 254 on the drag bar. Conversely, by slackening away on the cable 250 the cutter bar may reach a downwardly inclined position as indicated at 124*b*, as for example when cutting on an inclined bank. These adjustments may be accomplished without raising or lowering the inner end of the cutter bar. In the foregoing positions of adjustment it is assumed that the ground wheel is adjusted to support the outer end of the cutter bar at minimum height.

Referring now to Figure 6 there is shown an adjustment in which the drag bar 85 has been elevated by drawing in on the cable 250 after the lift arm 242 has contacted the abutment 254. When the drag bar has been elevated to the desired position a selected one of the links of the suspension chain 108 is engaged in the slot of the angle piece 256 thereby supporting the drag bar 85 independently of the power lift mechanism. At this time the cable 250 is slacked away to permit the cutter bar 124 to move downwardly to the position shown in Figure 6. Since the inner end of the cutter bar 124 is thus elevated, an appropriate adjustment will be made to the elevation of the ground wheel 302 to keep the cutter bar 124 level. It will be understood that this adjustment permits control of the height to which grass or other material is cut. By this arrangement the cutter bar may be operated horizontally or parallel to inclined ground at any desired point of elevation within the capacity of the machine.

Referring now to Figure 7 the mechanism is illustrated as operated to locate the drag bar 85 and cutter bar 124 in transport position. The parts are brought to the illustrated position by drawing in on the cable 250 until the drag bar 85 is swung upwardly to its limiting position as determined by its engagement with the stop 110. The weight of the drag bar will now be taken up by the suspension chain 108, as previously described. The cutter bar 124 is now manually swung to the illustrated vertical position and is connected to the transport rod 102 by suitable means. Ordinarily, the end of the transport rod 102 extends through an opening in the cutter bar 124 and is secured in position by a nut or the like.

With the foregoing described mechanism the operator can tilt the cutter bar vertically above and below horizontal without moving the inner end of the cutter bar or the inner shoe thereof. After the cutter bar has been tilted under power a predetermined amount, and ordinarily 15 degrees above horizontal, further power operation of the lift arm 242 swings the drag bar and cutter bar as a unit vertically to a predetermined position limited by engagement between the drag bar and an abutment on the tractor. Thereafter, the drag bar is suspended from the suspension chain and if cutting is to be carried out with the inner end of the cutter bar elevated, the cable is slacked off to permit the cutter bar to swing downwardly to a point as determined by the adjustment of the ground wheel 302, which will of course be appropriately adjusted to bring the cutter bar into parallelism with the ground.

For transport the drag bar is suspended from the chain and the cutter bar is swung manually to vertical position and secured in such position by the transport rod 102.

The drawings and the foregoing specification constitute a description of the improved adjustable mower cutter bar in such full, clear, concise and exact terms as to enable any person skilled in the art to practice the invention, the scope of which is indicated by the appended claims.

What I claim as my invention is:

1. In mowing mechanism for a tractor having a power lift lever thereon, a drag bar adapted to be disposed transversely beneath the tractor to extend substantially from side to side thereof, means for pivotally mounting one end of said drag bar to the tractor to provide for vertical swinging movement thereof, a center bar extending outwardly from the free end of said drag bar and having a shoe rigidly secured to its inner end, pivot means connecting said shoe to the free end of said drag bar for vertical swinging movement relative thereto, a lift arm pivoted to said shoe and operatively connected with said power lift lever, an abutment on said shoe engageable by said lift arm upon swinging thereof about its pivot thereby to raise the outer end of said cutter bar, a second abutment on said drag bar engageable by said lift arm to limit upward swinging of said cutter bar relative to said drag bar and to raise the free end of said drag bar and said cutter bar as a unit, a cable having one end connected directly to the free end of said lift arm and its other end connected directly to said power lift lever.

2. Structure as defined in claim 1 in which said drag bar comprises a pair of spaced straps, said shoe having a pair of spaced ears between which the free ends of said straps are received, said lift arm being pivoted to the outside of one of said ears, and said second abutment is carried at the outside of the strap adjacent said one ear.

3. In a tractor, a drag bar pivoted at one end thereto for swinging movement in a vertical plane, a cutter bar assembly pivoted to the free end of the drag bar for pivoting relatively thereto in a vertical plane, a lift arm pivoted to said cutter bar assembly, abutments on said cutter bar assembly and on said drag bar successively engageable by said lift arm in response to swinging of the cutter bar on its pivot to initially raise said cutter bar assembly relative to said drag bar and then to raise said drag bar and cutter bar assembly as a unit, power means for swinging said lift arm, a bracket secured to said tractor substantially over said drag bar, a chain depending from said bracket, a notched plate on said drag bar, the links of said chain being selectively engageable in the notched plate to suspend said drag bar in different elevated positions independently of said power means.

References Cited in the file of this patent

UNITED STATES PATENTS

| | | |
|---|---|---|
| 2,105,125 | Meinholdt | Jan. 11, 1938 |
| 2,165,851 | Harman | July 11, 1939 |
| 2,204,335 | Wagner | June 11, 1940 |
| 2,291,987 | Rogers | Aug. 4, 1942 |
| 2,502,805 | Spurlin | Apr. 4, 1950 |
| 2,517,384 | Brown | Aug. 1, 1950 |